(12) United States Patent
Combariza Rozo et al.

(10) Patent No.: US 11,602,925 B2
(45) Date of Patent: Mar. 14, 2023

(54) THERMOPLASTIC ELASTOMERIC COATED FABRIC PROTECTION WITH A TOP-COATING FINISHING SYSTEM

(71) Applicant: PROQUINAL SAS, Bogotá (CO)

(72) Inventors: María Cristina Combariza Rozo, Bogotá (CO); Juliana Lasprilla Botero, Bogotá (CO); Jorge Ricardo Santana Castillo, Bogotá (CO); Jesús Alberto Bejarano, Bogotá (CO)

(73) Assignee: Proquinal S.A.S., Bogota (CO)

( * ) Notice: Subject to any disclaimer, the term of this patent is extended or adjusted under 35 U.S.C. 154(b) by 0 days.

(21) Appl. No.: 17/584,573

(22) Filed: Jan. 26, 2022

(65) Prior Publication Data

US 2022/0234339 A1 Jul. 28, 2022

Related U.S. Application Data

(60) Provisional application No. 63/141,601, filed on Jan. 26, 2021.

(51) Int. Cl.
| | |
|---|---|
| *B32B 27/12* | (2006.01) |
| *B32B 27/32* | (2006.01) |
| *B32B 27/20* | (2006.01) |
| *B32B 5/02* | (2006.01) |
| *B32B 27/16* | (2006.01) |
| *B32B 37/24* | (2006.01) |

(52) U.S. Cl.
CPC ............... *B32B 27/12* (2013.01); *B32B 5/02* (2013.01); *B32B 27/16* (2013.01); *B32B 27/20* (2013.01); *B32B 27/32* (2013.01); *B32B 37/24* (2013.01); *B32B 2037/243* (2013.01); *B32B 2255/10* (2013.01); *B32B 2255/26* (2013.01); *B32B 2262/0276* (2013.01); *B32B 2264/104* (2013.01); *B32B 2307/4026* (2013.01); *B32B 2307/412* (2013.01)

(58) Field of Classification Search
CPC .......... B32B 2037/243; B32B 2255/10; B32B 2255/26; B32B 2262/0276; B32B 2264/104; B32B 2307/4026; B32B 2307/412; B32B 27/12; B32B 27/16; B32B 27/20; B32B 27/32; B32B 37/24; B32B 5/02
See application file for complete search history.

(56) References Cited

U.S. PATENT DOCUMENTS 3,367,793 A * 2/1968 Atwell .................. C08J 5/08
428/494

* cited by examiner

*Primary Examiner* — Lawrence D Ferguson
(74) *Attorney, Agent, or Firm* — The Morales Law Firm; Joseph L. Morales, Esq.

(57) ABSTRACT

The present invention refers to a coated textile product comprising a fabric substrate layer; a resin-based intermediate layer; and a protecting coating upper layer, wherein the protective layer comprises at least a first primer sublayer, a second printing sublayer, a third transparent sublayer, and a fourth protection sublayer, wherein the first sublayer is on top of the resin-based intermediate layer, and the protection sublayer is the most external layer of the textile product. In addition, the invention refers to a manufacture process to produce the coated textile product, including the surface treatment of the intermediate layer carried out to improve the adhesion of top coating layers avoiding the use of foams or adhesives.

23 Claims, 5 Drawing Sheets

THERMOPLASTIC ELASTOMERIC COATED FABRIC PROTECTION WITH A TOP-COATING FINISHING SYSTEM

FIELD OF THE INVENTION

This invention relates to the field of coated textiles, specifically the field of indoor furniture upholstery coated textiles.

BACKGROUND OF THE INVENTION

Coated textile products for applications in interior furniture are commonly composed of multilayered polymeric materials mainly comprising a backing textile support made with natural and synthetic fibers. Additives are included in order to provide color, resistance, and to achieve other mechanical, chemical, texture and visual properties.

There are several multilayered textile products in the technical field. The document U.S. Ser. No. 10/682,833 refers to a laminated fabric and a thermoplastic material, comprising a coating layer, a matrix, a substrate and a backing layer, and a method of manufacturing said material for making a product with an improved outer surface in terms of resistance to scratching, abrasion and stains, desirable appearance such as gloss, color and texture, allowing the printing of pigments. The coating layer comprises several synthetic polymeric materials, the matrix comprises a first polymeric material and a second thermoplastic material having different melting points, the substrate comprises a thermoplastic material, and the backing material comprises a woven or nonwoven fiber. The method to produce the multilayered material includes a continuous or discontinuous thermopressure process with the steps of i) providing a double-sided substrate of thermoplastic material, ii) forming a matrix by extruding one or more sheets of a thermoplastic components on a support sheet with different melting points, iii) bonding the substrate layer with the lower layer of the matrix, iv) laminate the substrate and the matrix by thermopressing, v) extrude one or more layers of thermoplastic material to the coating layer, vi) pass the sheet through a calender, vii) laminate the cover layer on the matrix and viii) laminate the backing layer by thermopressure.

The document US20190248106 refers to a multilayer composite material comprising one or more layers of a fabric (A) of between 0 and 20% polymeric fibers and between 80 and 100% of glass or carbon fibers, other layers of fabric (B) of between 20 and 70% of polymeric fibers and between 80 to 20% of glass or carbon fibers and a matrix layer, to provide a composite with structural strength, rigidity and impact resistance without delamination of its layers. The fabric layers include fibers of homopolymers and/or copolymers of alpha-olefins, polyamides and polyaramides, polyarylates, polyesters, among others, and inorganic fibers such as E-glass, S-glass, basalt fibers, and every fiber comprising Si, Al, O, Ca and/or Mg in their composition. Additionally, the multilayer composite material may comprise additional foam-like layers between the fabric layers. The matrix layer is formed by thermoplastics or thermosetting polymers such as epoxy, polyurethane, vinyl ester, phenolic, polyester resin and/or mixtures thereof and additionally, it comprises one or more additives such as pigments, dyes, fillers, stabilizers, among others. This document also refers to a method to manufacture said multilayered composite material, comprising the steps of assembling one or more interleaved layers of fabric A and B, respectively, applying a pressure of between 0 and 50 bar at room temperature to below the melting point of the polymer fibers and add the matrix to the stack of compression layers by impregnation.

The document U.S. Pat. No. 9,636,893 refers to a composite sheet of thermoplastic material that includes a cover layer, an adhesion-promoting matrix layer and a substrate that provides a product with resistance to scratching, abrasion, staining to the elements, to cracking, among others. The covering layer, the matrix layer and the substrate can be selected from several plastics. This document also refers to a manufacturing method comprising applying two heating processes, one to extrude the matrix and the coating layer and, the other for the thermoforming of the matrix with the substrate. Additionally, surface treatments can be incorporated to modify the surface of the PET layers, such as solvent treatments, corona discharge treatments, with plasma, with flame, with UV, among others.

However, there is still a need to provide coated textiles that meet the market demands in terms of mechanical, chemical, visual, and texture properties, while satisfying high environmental protection standards.

BRIEF SUMMARY OF THE INVENTION

The present invention relates to a coated textile product comprising pigments, functional coatings and protective coatings, as well as the method of obtaining said fabric. The fabric is useful for interior furniture upholstery applications, which will not be exposed to direct high UV radiation or extreme environmental conditions.

In an embodiment, the invention refers to a coated textile product mainly comprising a fabric substrate layer (100); a resin-based intermediate layer (200); and a protecting coating upper layer (300), wherein the protective coating upper layer (300) comprises several sublayers applied in a particular configuration, in order to obtain a textile product that provides high performance and resistance to the surface of the fabric in terms of resistance to abrasion and mechanical stresses, flexibility, stain and chemical resistance, allowing not to use foam or adhesive to form the final product. The protecting coating upper layer (300) mainly comprises at least a first primer sublayer (310), a second printing sublayer (320), a third transparent sublayer (330), and a fourth protection sublayer (340), wherein the first primer sublayer (310) is on top of the resin-based intermediate layer (200), and the fourth protection sublayer (340) is the most external layer of the coated textile product. Additional sublayers can also be included in some embodiments of the coated textile product.

In an embodiment, the invention relates to a process for producing the coated textile product of the present invention, mainly comprising the steps of laminating a resin-based intermediate layer (200) with the fabric substrate layer (100); applying a surface treatment on the free surface of the resin-based intermediate layer (200); sequentially applying a series of sublayers on the treated surface of the resin-based intermediate layer (200); and the curing process of the most exterior layer of the product. The process of the invention also refers to the optional application of additional sublayers, as well as the optional embossing-printing of a pattern on the curated external surface of the coated textile product.

The resulting coated textile product provides exceptional performance characteristics, such as remarkable resistance to abrasion and mechanical stresses, flexibility performance, stain resistance against several substances, and chemical resistance against several solvents and cleaning products. In addition, the manufacture process of the invention allows to obtain a product that does not need to include foams, adhesives, harmful components like chlorine, halogens, phthalates, BPA, latex, toxic solvents, flame retardants, biocides, or other toxic additives to preserve its mechanical performance, quality and durability.

DETAILED DESCRIPTION OF THE INVENTION

Figure 1:
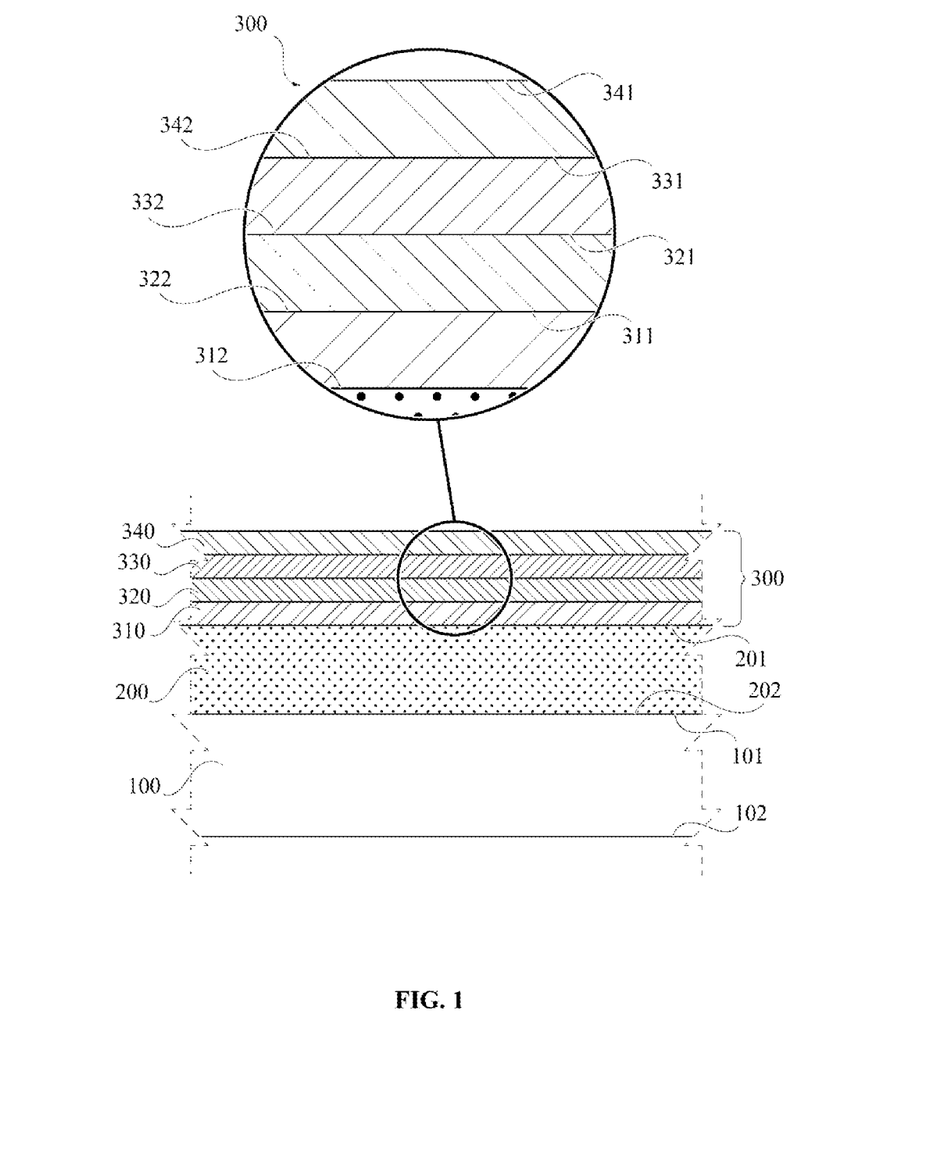
FIG. 1. Schematic cross-section view of a coated textile product according to one embodiment of the invention, comprising a protecting coating upper layer (300) having 4 sublayers, and a circled detailed view of the protecting coating upper layer (300).

Referring to FIG. 1, in an embodiment of the present invention, the coated textile product comprises: a fabric substrate layer (100) having an upper surface (101) and a lower surface (102); a resin-based intermediate layer (200) having an upper surface (201) and a lower surface (202); and a protecting coating upper layer (300), comprising at least the following sublayers in the following order: a first primer sublayer (310) having an upper surface (311) and a lower surface (312); a second printing sublayer (320) having an upper surface (321) and a lower surface (322); a third transparent sublayer (330) having an upper surface (331) and a lower surface (332); and a fourth protection sublayer (340) having an upper surface (341) and a lower surface (342); wherein the lower surface (312) of the first primer sublayer (310) is facing towards the upper surface (201) of the resin-based intermediate layer (200) and the upper surface (341) of the protection sublayer (340) is the external surface of the coated textile product.

A fabric substrate layer as used in the present invention is a fabric material that serves as a base on which one or more layers of other materials are applied. In an embodiment of the invention, the fabric substrate layer (100) is selected from, but not limited to natural fibers, synthetic fibers, semi-synthetic fibers, and possible combinations thereof. Natural fibers may include, but are not limited to flax, hemp, kenaf, jute, ramie, isora, nettle, pineapple, sisal, abaca, curaua, palm, cabuya, opuntia, paja toquilla, yucca, pita, cotton, coir, kapok, poplar, calotropis, luffa, bamboo, totora, hardwood, softwood, wool, and silk. Synthetic fibers may include, but are not limited to, acrylic, Kevlar, modacrylic, nomex, nylon, polyester, and spandex. Semi-synthetic fibers may include, but are not limited to, rayon, viscose, modal, lyocell, seacell, and cupro.

The fabric substrate layer (100) may also include, but not limited to, polyethylene (PE), polyamide (PA), polyethylene ether/oxide (PPO), polycarbonates (PC), polyphenylene sulfide (PPS), polyvinyl chloride (PVC), polyglycolide or polyglycolic acid (PGA), polylactic acid (PLA), polycaprolactone (PCL), polyhydroxyalkanoate (PHA), polyhydroxybutyrate (PHB), polyethylene adipate (PEA), polybutylene succinate (PBS), poly(3-hydroxybutyrate-co-3-hydroxyvalerate) (PHBV), polyethylene terephthalate (PET) polybutylene terephthalate (PBT), polytrimethylene terephthalate (PTT), polyethylene naphthalate (PEN), vectran, or copolymers thereof.

In an embodiment of the invention, the fabric substrate layer (100) is selected from, but not limited to polyester, cotton, nylon, and mixtures of them. In an embodiment of the present invention, the fabric substrate layer (100) may be in a woven, non-woven, knitted, chopped, stitched, random laid, braided or continuous strand form.

In an embodiment of the invention, the fabric substrate layer (100) is present in a quantity between 130 and 420 $g/m^2$. In an embodiment of the invention, the fabric substrate layer (100) is present in a quantity between 150 and 400 $g/m^2$. In an embodiment of the invention, the fabric substrate layer (100) is present in a quantity between 170 and 370 $g/m^2$. In an embodiment of the invention, the fabric substrate layer (100) is present in a quantity between 180 and 330 $g/m^2$. In an embodiment of the invention, the fabric substrate layer (100) is present in a quantity between 200 and 290 $g/m^2$.

A resin based-intermediate layer as employed in the present invention, that is a layer that helps to introduce resistance to penetration and impermeability to the fabric substrate layer (100) (to liquids, gases and dust particles), as well as enhance and extend the range of functional performance properties of textiles by improving fabric abrasion, flexibility, stain resistance against several substances, and chemical resistance against several solvents and cleaning products. It can also help to modify the appearance for decorative purposes.

In an embodiment of the invention, the resin-based intermediate layer (200) is a thermoplastic elastomeric (TPE) resin-based intermediate layer (200). The TPE is selected from, but not limited to, a styrenic block copolymers (TPS or TPE-S), thermoplastic polyolefin elastomers (TPO or TPE-O), thermoplastic vulcanizate elastomers, TPV (TPE-V or TPV), thermoplastic polyurethanes (TPE-U or TPU), thermoplastic copolyester (TPE-E or TPC), thermoplastic polyamides (TPE-A or TPA), and not classified thermoplastic elastomers (TPZ). In an embodiment of the present invention, the resin-based intermediate layer (200) is selected from TPE-O, TPE-U, TPE-V, TPE-E, TPE-A and TPE-S.

TPE-S are usually defined as thermoplastic elastomers based on a styrene-butadiene-styrene block copolymer (SBS) or a styrene-ethylene-butylene-styrene block copolymer (SEBS). The SBS is based on two-phase block copolymers with hard and soft segments. The styrene end blocks provide the thermoplastic properties and the Butadiene mid-blocks provide the elastomeric properties. This type of TPS material is commonly used in footwear, adhesives and lower specification seals and grips, where resistance to chemicals and aging are not critical. On the other hand, when the SBS is hydrogenated, it becomes SEBS. TPS polymers based on SEBS are characterized by improved heat resistance, mechanical properties and chemical resistance. They also exhibit excellent weathering, UV and ozone resistance making them ideal choice for outdoor and long service life applications.

TPE-O are usually defined as thermoplastic/elastomer/filler blends, wherein a thermoplastic may include polypropylene (PP), polyethylene (PE), block copolymer polypropylene (BCPP), and other thermoplastics known in the technical field, fillers include, though are not restricted to talc, fiberglass, carbon fiber, wollastonite, and metal oxy sulfates (MOS), and common elastomers include ethylene propylene rubber (EPR), EPDM (EP-diene rubber), ethylene-octene (EO), ethylbenzene (EB), and other elastomers known in the technical field.

TPE-V are commonly defined as a thermoplastic/vulcanized rubber blend, mainly rubber particles encapsulated in a polymer matrix, wherein the thermoplastic or polymer is usually defined as polypropylene (PP), and the vulcanized rubber is usually identified as fully cured ethylene propylene diene (EPDM) rubber, although other TPE-V known in the technical field are equally appropriate in the present invention.

TPE-U are usually defined as a block copolymer consisting of alternating sequences of hard and soft segments or domains formed by the reaction of (1) diisocyanates with short-chain diols (so-called chain extenders) and (2) diisocyanates with long-chain diols, at different ratios depending on the desired mechanical properties. In this way, the hard segment can be either aromatic or aliphatic in nature. Aromatic TPE-Us are based on isocyanates such as methylene diphenyl diisocyanate (MDI). Aliphatic TPE-Us are based on isocyanates like $H_{12}MDI$, hexamethylene diisocyanate (HDI) and isophorone diisocyanate (IPDI) are light stable and offer excellent optical clarity. When these isocyanates are combined with various short chain diols they become a hard block. The soft segment can be either polyether or polyester type. The choice affects the relative suitability for a given application. For use in wet environments, for example, a polyether-based TPU is preferred. When oil and hydrocarbon resistance are primary factors, a polyester-based TPU is the material of choice. Another polyester type, polycaprolactone, also provides oil and hydrocarbon resistance with improved hydrolytic stability.

TPE-E are usually defined as a copolyester compound made from copolyester elastomers (COPE) which are high performance, high temperature elastomers that have many features of thermoset rubber but the processing ease of engineering plastics. Those TPE offer toughness, tear resistance, and good flex fatigue along with good chemical and temperature resistance. Common applications include automotive, appliance, electrical, consumer, furniture and lawn and garden components. Examples of TPE-E may include Amitel from DSM, Riteflex from Celanese, and Hytrel from DuPont.

TPE-A are usually defined as polyamide thermoplastic elastomer. They are block copolymers made up of rigid polyamide blocks and soft elastomeric polyether blocks. Manipulating these blocks and their relative ratio allows for the creation of a large range of resins that spans the flexibility spectrum from very hard and rigid to very soft and flexible, without the need for plasticizers. TPE-A polymers can be based on polyester-amide (PEA), polyether-ester-amide (PEEA), or polyether-amide (PEBA) block copolymers.

TPZ are usually defined as an alloy family of plasticized PVC and nitrile rubber with enhanced resistance to solvents and greases. They possess good chemical and aging resistance, offer elasticity, and colorability. They are suitable for injection molding and extrusion, because they offer good processability. They are particularly suitable for the manufacture of opaque products with a specific chemical resistance. One example of TPZ is the APILON™ 33 TPZ reference from Trinseo, which is available both with and without phthalate plasticizers, and is free from stabilizers containing heavy metals.

In an embodiment of the invention, the resin-based intermediate layer (200) further comprises a pigment masterbatch. A pigment masterbatch is usually defined as a solid additive that transform thermoplastic and thermoset polymers from colorless and opaque materials to brilliant and colored, in this case this is used for coloring the TPE. Examples of a pigment masterbatch may include the MESGO compounding solutions from Hexpol company, the color and additive masterbatches from M. G. Polyblends, the color masterbatch line from Treffert, among many others. In an embodiment of the invention, the pigment masterbatch is a concentrated mixture of pigments encapsulated into a carrier resin based on a wax (universal carrier) or on a specific polymer, identical or compatible with the natural polymer used (polymer-specific). For instance, EVA, PP, PE or LDPE can be used as carriers for polyolefins and nylon, polystyrene can be used for ABS, SAN, and sometimes polycarbonates. The vehicle can also take the form of powders or even liquids that are compatible with the end use polymers. In an embodiment of the invention, the pigment masterbatch is selected from organic or inorganic pigments, and it is compounded in a LDPE carrier and formed in pellets. These pellets are produced through a compounding extrusion process, where a twin-screw extruder is fed with premixed granules of the carrier polymer and the pigment in liquid or solid form. Then, that mixture is fused together in the extruder and, the outcome is cut in pellets forms through a pelletizing machine equipped with a cooling bath.

In an embodiment of the invention, the resin-based intermediate layer (200) further comprises a mineral filler additive. Mineral fillers are usually defined as insoluble materials in which they are in powder form, and are used to increase volume, obtain or increase certain technical properties and/or alter optical properties. These materials may give many features to the system in which they are added, depending on whether they are active or inactive. In an embodiment of the invention, the filler is selected from calcium carbonate, dolomite, sodium carbonate, talc, silica, wollastonite, clay, calcium sulfate fibers, mica, glass beads, and alumina trihydrate. In an embodiment of the invention, the filler is selected from calcium carbonate, dolomite, barite, talc, kaolin, mica, quartz sand, and wollastonite. In an embodiment of the invention, the filler is selected from calcium carbonate and dolomite.

In an embodiment of the invention, the resin-based intermediate layer (200) further comprises an antiblock additive. Antiblock additives are usually defined as additives that help to reduce blocking (adhesion between film sheets) at the surface of polymer films and other plastic articles to allow easier processing and handling. Polyolefin films tend to adhere to each other due to strong van der Waals interaction or electrostatic charges when being in close contact (adjacent layers). The higher the temperature, pressure, and contact/processing time, the higher the tendency to stick to each other. To avoid the adherence of layers due to a close contact, particulate matter is introduced into the layer in a highly diluted concentration. Examples of antiblock additives may include talc, calcined kaolin, cristobalite, precipitated silica, diatomaceous earth, mica, calcium carbonates, calcium sulfate (anhydrite), magnesium carbonate, magnesium sulfate, and feldspars. Those minerals should have little to no impact on the mechanical properties of the film; must not deteriorate transparency, haze, color, gloss of the film; and should be compatible with the film-processing process.

In an embodiment of the invention, the resin-based intermediate layer (200) further comprises a process aid additive. Process aid additives are usually defined as liquid additives for plastics used for improving the processability of the polymers during the extrusion process. Examples of process aid additives may include epoxidized oils, plasticizers, rheology modifiers, release agents and fluoropolymers. In an embodiment of the invention, a process aid additive is selected from epoxidized soybean oil (ESO), epoxidized castor oil (ECasO), epoxidized safflower oil, epoxidized neem oil and, epoxidized linseed oil. In another embodiment of the invention, the resin-based intermediate layer (200) does not comprise a process aid additive.

In an embodiment of the invention, the resin-based intermediate layer (200) is present in a quantity between 190 and 290 $g/m^2$. In an embodiment of the present invention, the resin-based intermediate layer (200) comprises between 70% and 90% w/w of TPE, between 3% and 7% w/w of pigment masterbatch, between 1% and 12% w/w of the mineral filler additive, between 1% and 4% w/w of the antiblock additive, and between 0 and 5% w/w of a process aid additive. In an embodiment of the invention, the resin-based intermediate layer (200) comprises between 78% and 86% w/w of TPE, between 3% and 7% w/w of pigment masterbatch, between 8% and 12% w/w of the mineral filler additive, and between 2% and 4% w/w of the antiblock additive.

In an embodiment of the invention, the resin-based intermediate layer (200) has a surface treatment on the upper surface (201). This surface treatment allows the adhesion of additional layers on said upper surface (201) without the use of adhesives. Therefore, in an embodiment of the invention, the textile product does not comprise adhesive additives on the upper surface (201) of the resin-based intermediate layer (200). In an embodiment of the invention, the textile product does not comprise adhesives in any of the surfaces of any of its layers and sublayers. The surface treatment may be selected, but not limited to corona, flame, chemical attack, solvent attack, plasma, and radiofrequency treatments.

A protecting coating upper layer as employed in the present invention, that is a layer that serves as shield against abrasion, wear, stains, chemical agents attack, ageing caused by environmental factors as water or UV light and liquids penetration. Referring to FIG. 1, in an embodiment of the present invention, the protecting coating upper layer (300) comprises at least a first primer sublayer (310) having an upper surface (311) and a lower surface (312); a second printing sublayer (320) having an upper surface (321) and a lower surface (322); a third transparent sublayer (330) having an upper surface (331) and a lower surface (332); and a fourth protection sublayer (340) having an upper surface (341) and a lower surface (342). In addition, these layers are arranged in such a way that the lower surface (312) of the first primer sublayer (310) is facing towards the upper surface (201) of the resin-based intermediate layer (200) and the upper surface (341) of the protection sublayer (340) is the external surface of the coated textile product. These sublayers are applied in the order mentioned above. Applying these layers in a different order does not provide the same properties, it could cause loss of adherence between them, discoloration of the printed inks, reduction of abrasion wear resistance, loss of chemical and environmental resistance, and altering the final dimension of the product (mainly reducing of the final width of the product).

In an embodiment of the present invention, the first primer sublayer (310) is a first polyurethane-based primer sublayer (310). The polyurethane may be water-based or solvent-based polyurethane. In an embodiment of the invention, the first primer sublayer (310) is present between 1 and 7 $g/m^2$. In an embodiment of the invention, the first primer sublayer (310) is present between 2 and 7 $g/m^2$. In an embodiment of the invention, the first primer sublayer (310) is present between 2 and 5 $g/m^2$. In an embodiment of the invention, the first primer sublayer (310) is present between 2 and 3 $g/m^2$. The first primer sublayer (310) may additionally comprise additives such as crosslinking agents, and solvent mixtures as process aids. In an embodiment of the invention, the first primer sublayer (310) also comprises a cross-linking agent. In this embodiment, the cross-linking agent represents between 3% and 8% w/w of the first primer sublayer (310). In an embodiment of the invention, the cross-linking agent represents between 3% and 6% w/w of the first primer sublayer (310). In an embodiment of the invention, the first cross-linking agent represents 5% w/w of the first primer sublayer (310).

In an embodiment of the present invention, the second printing sublayer (320) is a second polyurethane-based printing sublayer (320). The polyurethane may be water-based or solvent-based polyurethane. In an embodiment of the invention, the second printing sublayer (320) further comprises at least one pigment. In an embodiment of the invention, the second printing sublayer (320) comprises 2, 3, 4 or 5 pigments. Such pigments are used for modifying the appearance of fabrics for decorative purposes. The pigments may be independently selected from, but not limited to, organic pigments, inorganic pigments, solvent-based pigment preparations, solid pigments and effect pigments. In an embodiment of the invention, the pigments represent between 0.1% and 10% w/w of the second printing sublayer (320). In an embodiment of the invention, the pigments represent between 2% and 10% w/w of the second printing sublayer (320). In an embodiment of the invention, the pigments represent between 5% and 10% w/w of the second printing sublayer (320). In an embodiment of the invention, the pigments represent between 8% and 10% w/w of the second printing sublayer (320). In an embodiment of the invention, the pigments represent 10% w/w of the second printing sublayer (320). In an embodiment of the invention, the second printing sublayer (320) is present between 1 and 5 $g/m^2$. In an embodiment of the invention, the second printing sublayer (320) is present between 2 and 5 $g/m^2$. In an embodiment of the invention, the second printing sublayer (320) is present between 2 and 4 $g/m^2$. In an embodiment of the invention, the second printing sublayer (320) is present between 2 and 3 $g/m^2$. The second printing sublayer (320) may additionally comprise additives such as crosslinking agents, and mixtures of solvents as process aids, among other additives commonly used in the technical field. In an embodiment of the invention, the second printing sublayer (320) also comprises a cross-linking agent. In this embodiment, the cross-linking agent represents between 3% and 8% w/w of the second printing sublayer (320). In an embodiment of the invention, the cross-linking agent represents between 3% and 6% w/w of the second printing sublayer (320). In an embodiment of the invention, the first cross-linking agent represents 5% w/w of the second printing sublayer (320).

In an embodiment of the present invention, the third transparent sublayer (330) is a third polyurethane-based transparent sublayer (330). The polyurethane may be water-based or solvent-based polyurethane. In an embodiment of the invention, the third transparent sublayer (330) is present between 1 and 7 g/m². In an embodiment of the invention, the third transparent sublayer (330) is present between 2 and 5 g/m². In an embodiment of the invention, the third transparent sublayer (330) is present between 2 and 4 g/m². In an embodiment of the invention, the third transparent sublayer (330) is present between 2, 5 and 3.5 g/m². In an embodiment of the invention, the third transparent sublayer (330) further comprises a cross-linking agent. In an embodiment of the invention, the cross-linking agent represents between 3% and 8% w/w of the third transparent sublayer (330). In an embodiment of the invention, the cross-linking agent represents between 3% and 6% w/w of the third transparent sublayer (330). In an embodiment of the invention, the cross-linking agent represents 5% w/w of the third transparent sublayer (330).

In an embodiment of the present invention, the fourth protection sublayer (340) is a fourth polyurethane-based protection sublayer (340). The polyurethane may be water-based or solvent-based polyurethane. In an embodiment of the invention, the water- or solvent-based polyurethane is curable. Curing methods may include, but are not limited to time curing, chemical curing, UV curing, and temperature curing. In an embodiment of the invention, the water-based or the solvent-based polyurethanes are UV curable. In an embodiment of the invention, the water-based or the solvent-based polyurethanes are high-resistance polyurethanes. In an embodiment of the invention, the fourth protection sublayer (340) is present in at least 7 g/m². The fourth protection sublayer (340) may comprise additional additives such as a photo initiator additive, a touch modifier additive, a defoaming additive, a mating agent, among other additives commonly used in the technical field. In an embodiment of the invention, the fourth protection sublayer (340) further comprises a cross-linking agent. In an embodiment of the invention, the cross-linking agent represents between 5% and 10% w/w of the fourth protection sublayer (340). In an embodiment of the invention, the cross-linking agent represents between 6% and 9% w/w of the fourth protection sublayer (340). In an embodiment of the invention, the cross-linking agent represents 7% w/w of the fourth protection sublayer (340).

In any embodiment of the invention where a cross-linking agent is present, said cross-linking agent is used for creating bridges among the urethane chains to form a three-dimensional network of connected molecules. In any embodiment of the invention where the cross-linking agent is present, it is independently selected from but not limited to, aliphatic isocyanate, aromatic isocyanate, aziridine, polycarbodimide, and amines.

Figure 2:
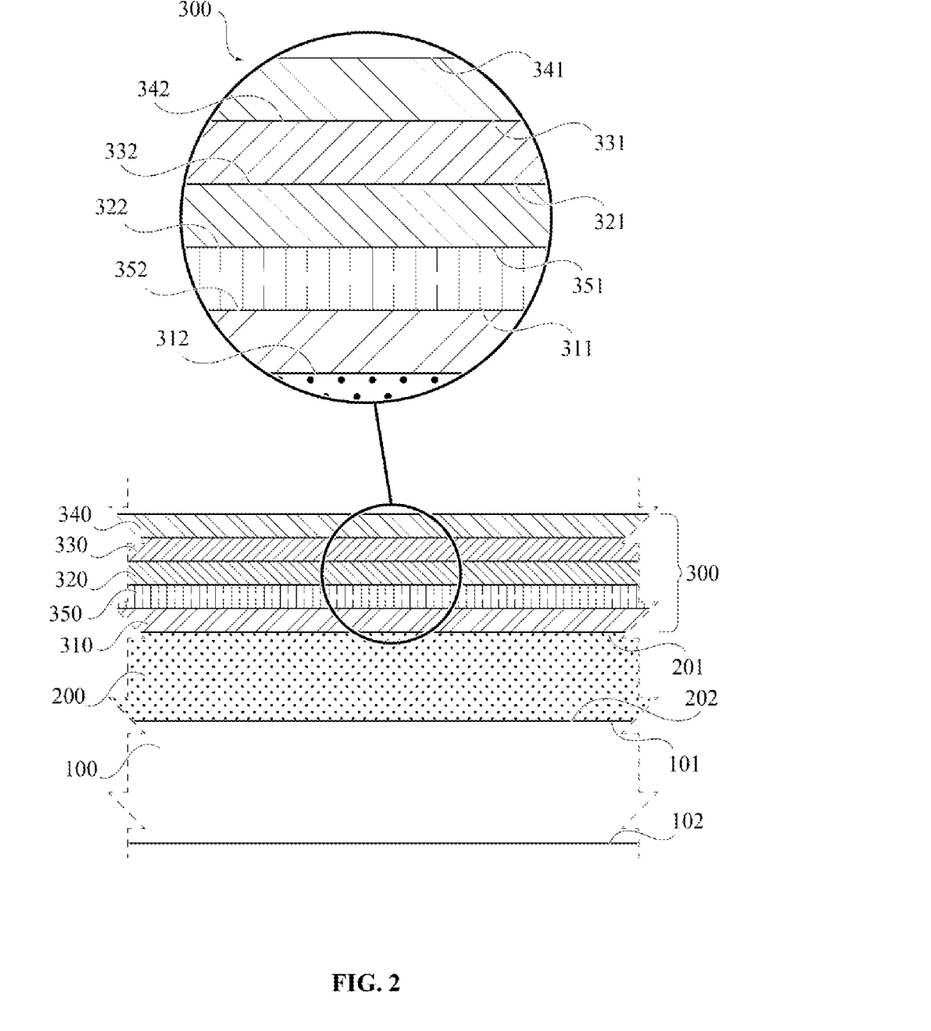
FIG. 2. Schematic cross-section view of a coated textile product according to one embodiment of the invention, comprising a protecting coating upper layer (300) further including an additional metallic sublayer (350), and a circled detailed view of the protecting coating upper layer (300).

Referring to FIG. 2, in another embodiment of the present invention, the coated textile product comprises: a fabric substrate layer (100) having an upper surface (101) and a lower surface (102); a resin-based intermediate layer (200) having an upper surface (201) and a lower surface (202); and a protecting coating upper layer (300), comprising at least the following sublayers in the following order: a first primer sublayer (310) having an upper surface (311) and a lower surface (312); an additional metallic sublayer (350) having an upper surface (351) and a lower surface (352); a second printing sublayer (320) having an upper surface (321) and a lower surface (322); a third transparent sublayer (330) having an upper surface (331) and a lower surface (332); and a fourth protection sublayer (340) having an upper surface (341) and a lower surface (342); wherein the lower surface (312) of the first primer sublayer (310) is facing towards the upper surface (201) of the resin-based intermediate layer (200) and the upper surface (341) of the protection sublayer (340) is the external surface of the coated textile product.

In this embodiment, the additional metallic sublayer (350) is an additional polyurethane-based metallic sublayer (350). The polyurethane may be water-based or solvent-based polyurethane. In an embodiment of the invention, the additional metallic sublayer (350) further comprises effect pigments. In an embodiment of the invention, the additional metallic sublayer (350) is present between 1 and 7 g/m². In an embodiment of the invention, the additional metallic sublayer (350) is present between 2 and 5 g/m². In an embodiment of the invention, the additional metallic sublayer (350) is present between 2 and 4 g/m². In an embodiment of the invention, the additional metallic sublayer (350) is present between 2 and 3 g/m². The additional metallic sublayer (350) may additionally comprise additives such as cross-linking agents, and mixtures of solvents as process aids. In an embodiment of the invention, the additional metallic sublayer (350) also comprises a cross-linking agent. In this embodiment, the cross-linking agent represents between 3% and 8% w/w of the additional metallic sublayer (350). In an embodiment of the invention, the cross-linking agent represents between 3% and 6% w/w of the additional metallic sublayer (350). In an embodiment of the invention, the first cross-linking agent represents 5% w/w of the additional metallic sublayer (350). The remaining elements of the coated textile product are as defined above.

Figure 3:
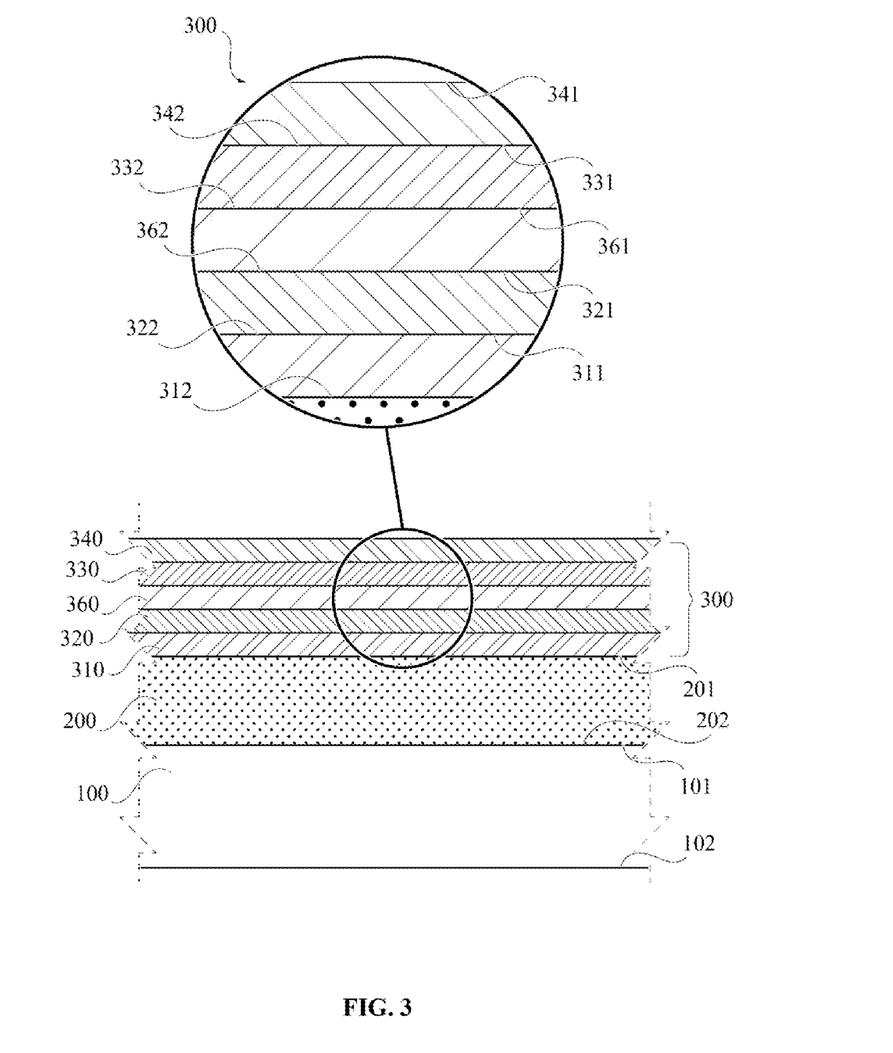
FIG. 3. Schematic cross-section view of a coated textile product according to one embodiment of the invention, comprising a protecting coating upper layer (300) further including an additional printing sublayer (360), and a circled detailed view of the protecting coating upper layer (300).

Referring to FIG. 3, in another embodiment of the present invention, the textile product comprises: a fabric substrate layer (100) having an upper surface (101) and a lower surface (102); a resin-based intermediate layer (200) having an upper surface (201) and a lower surface (202); and a protecting coating upper layer (300), comprising at least the following sublayers in the following order: a first primer sublayer (310) having an upper surface (311) and a lower surface (312); a second printing sublayer (320) having an upper surface (321) and a lower surface (322); an additional printing sublayer (360) having an upper surface (361) and a lower surface (362); a third transparent sublayer (330) having an upper surface (331) and a lower surface (332); and a fourth protection sublayer (340) having an upper surface (341) and a lower surface (342); wherein the lower surface (312) of the first primer sublayer (310) is facing towards the upper surface (201) of the resin-based intermediate layer (200) and the upper surface (341) of the protection sublayer (340) is the external surface of the coated textile product.

In this embodiment, the additional printing sublayer (360) is an additional polyurethane-based printing sublayer (360). The polyurethane may be water-based or solvent-based polyurethane. In an embodiment of the invention, the additional printing sublayer (360) further at least one pigment. In an embodiment of the invention, the additional printing sublayer (360) comprises 2, 3, 4 or 5 pigments. Such pigments are used for modifying the appearance of surface for decorative purposes. The pigments may be independently selected from, but not limited to, organic pigments, inorganic pigments, solvent-based pigment preparations, solid pigments and effect pigments. In an embodiment of the invention, the pigments represent between 0.1% and 10% w/w of the additional printing sublayer (360). In an embodiment of the invention, the pigments represent between 2% and 10% w/w of the additional printing sublayer (360). In an embodiment of the invention, the pigments represent between 5% and 10% w/w of the additional printing sublayer (360). In an embodiment of the invention, the pigments represent between 8% and 10% w/w of the additional printing sublayer (360). In an embodiment of the invention, the pigments represent 10% w/w of the additional printing sublayer (360). In an embodiment of the invention, the additional printing sublayer (360) is present between 1 and 7 g/m$^2$. In an embodiment of the invention, the additional printing sublayer (360) is present between 2 and 5 g/m$^2$. In an embodiment of the invention, the additional printing sublayer (360) is present between 2 and 4 g/m$^2$. In an embodiment of the invention, the additional printing sublayer (360) is present between 2 and 3 g/m$^2$.

The additional printing sublayer (360) may additionally comprise additives such as cross-linking agents, and mixtures of solvents as process aids. In an embodiment of the invention, the additional printing sublayer (360) also comprises a cross-linking agent. In this embodiment, the cross-linking agent represents between 3% and 8% w/w of the additional printing sublayer (360). In an embodiment of the invention, the cross-linking agent represents between 3% and 6% w/w of the additional printing sublayer (360). In an embodiment of the invention, the first cross-linking agent represents 5% w/w of the additional printing sublayer (360). The remaining elements of the coated textile product are as defined above.

Figure 4:
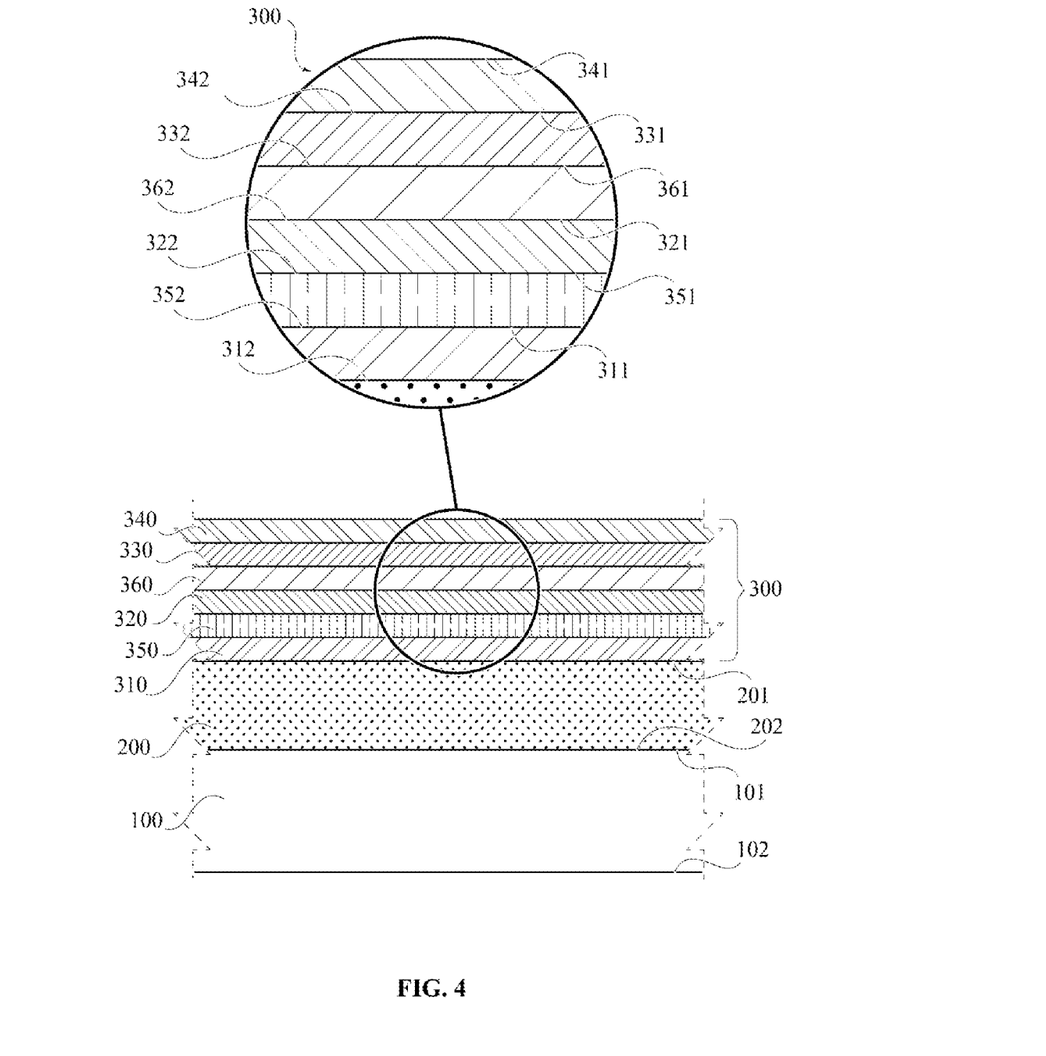
FIG. 4. Schematic cross-section view of a coated textile product according to one embodiment of the invention, comprising a protecting coating upper layer (300) further including an additional metallic sublayer (350), and a circled detailed view of the protecting coating upper layer (300).

Referring to FIG. 4, in another embodiment of the present invention, the coated textile product comprises: a fabric substrate layer (100) having an upper surface (101) and a lower surface (102); a resin-based intermediate layer (200) having an upper surface (201) and a lower surface (202); and a protecting coating upper layer (300), comprising at least the following sublayers in the following order: a first primer sublayer (310) having an upper surface (311) and a lower surface (312); an additional metallic sublayer (350) having an upper surface (351) and a lower surface (352); a second printing sublayer (320) having an upper surface (321) and a lower surface (322); an additional printing sublayer (360) having an upper surface (361) and a lower surface (362); a third transparent sublayer (330) having an upper surface (331) and a lower surface (332); and a fourth protection sublayer (340) having an upper surface (341) and a lower surface (342); wherein the lower surface (312) of the first primer sublayer (310) is facing towards the upper surface (201) of the resin-based intermediate layer (200) and the upper surface (341) of the protection sublayer (340) is the external surface of the coated textile product.

In this embodiment, all the elements comprised in the coated textile product are as defined above.

In any of the embodiments of the invention, the protecting coating upper layer (300) is present in a quantity between 8 and 18 g/m$^2$, independently of the number of sublayers it may comprise. In an embodiment of the invention, the protecting coating upper layer (300) is present in a quantity between 10 and 18 g/m$^2$, independently of the number of sublayers it may comprise. In an embodiment of the invention, the protecting coating upper layer (300) is present in a quantity between 12 and 18 g/m$^2$, independently of the number of sublayers it may comprise. In an embodiment of the invention, the protecting coating upper layer (300) is present in a quantity between 13.5 and 18 g/m$^2$, independently of the number of sublayers it may comprise.

In an embodiment of the present invention, the coated textile product is free from adhesives or foams. In an embodiment of the present invention, the coated textile product is free from harmful components like chlorine, halogens, phthalates, BPA, latex, or toxic solvents, such as formaldehyde or dimethylformamide (DMF). In an embodiment of the invention, the textile product does not either comprise biocides or flame retardants. In an embodiment of the invention, the coated textile product does not either comprise toxic additives such as halogens or fluorine containing polymers.

The present invention also refers to a process to manufacture the coated textile product of the invention.

Figure 5A:
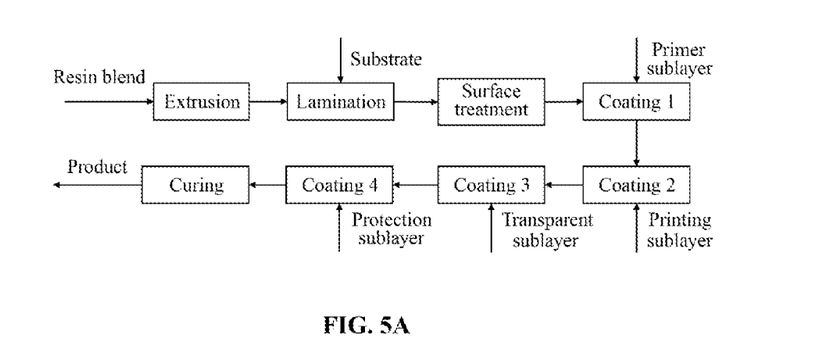
FIG. 5A. Schematic flow diagram of the manufacture process according to the invention.

Referring to FIG. 5A, in an embodiment of the present invention, the process to produce a coated textile product according to the invention comprises at least the following steps: (a) extruding a resin to obtain the resin-based intermediate layer (200); (b) laminating the extrusion product of step (a) by pressuring the lower surface (202) of the resin-based intermediate layer (200) to the upper surface (101) of the fabric substrate layer (100); (c) applying a surface treatment on the upper surface (201) of the resin-based intermediate layer (200) obtained in step (b); (d) applying the first primer sublayer (310) by contacting its lower surface (102) with the treated surface of step (c); (e) applying the second printing sublayer (320) by contacting its lower surface (322) with the upper surface (311) of the first primer sublayer (310) from step (d); (0 applying the third transparent sublayer (330) by contacting its lower surface (332) with the upper surface (321) of the second printing sublayer (320) from step (e); (g) applying the fourth protection sublayer (340) by contacting its lower surface (342) with the upper surface (331) of the third transparent sublayer (330) from step (0; and (h) curing the protection sublayer (340) from step (g).

The resin used in the extrusion process comprises a thermoplastic elastomeric resin (TPE) as described above. In the embodiments where the TPE resin further comprises additional ingredients such as pigments, fillers, and/or additives, these ingredients may be mixed with the resin before or during the extrusion process. In an embodiment of the invention, the ingredients are mixed before the extrusion process, using compounding extruder machine, or any other machinery serving the same purpose known in the technical field. The compounding extrusion process is performed using a twin-screw extruder machine, or any other machinery serving the same purpose known in the technical field, at 110-150° C. of temperature in the heating chambers, 7 Hz of spindle speed, 450 rpm of shear rate, 22 rpm of dosing speed and 130° C. of head temperature. In an embodiment of the invention, the extrusion product may be in the form of pellets, which are subsequently melted to form the resin-based intermediate layer (200).

In an embodiment of the invention, the melting process of the pellets (step a) may be performed by extruding the pellets, using a planetary extruder machine, or any other machinery serving the same purpose known in the technical field. In an embodiment, the pellet extrusion process is performed between 160 and 170° C. at 8 m/min. In an embodiment of the invention, the resulting profile of the extrusion product may be round, which then undergoes a flattening process before the lamination step (b). This flattening process is performed using plane die extrusion, or any other machinery serving the same purpose known in the technical field. In an embodiment of the invention, the resulting profile of the extrusion product may be flat, hence being ready for the lamination step. The extrusion process conditions depend on the melting points of the resin and additives, as well as the polarity and other force interactions between each material. In an embodiment of the present invention, the extrusion process is performed at 160-170° C. at 8 m/min.

The lamination of step (b) is performed using a calender machine or any other machinery serving the same purpose known in the technical field. In an embodiment of the invention, the lamination process includes a calender machine equipped with three hot cylinders, which join the fabric layer substrate (100) to the resin-based intermediate layer (200), by means of applying heat and pressure on the layers. In an embodiment of the present invention, the lamination process is performed at 160-180° C. and at 8 m/min.

The surface treatment of step (c) may be selected from, but not limited to, corona, flame, chemical attack, solvent attack, plasma, radiofrequency treatment, or a combination thereof. In an embodiment of the invention, the surface treatment is corona treatment. In an embodiment of the invention, the treatment is performed using a corona treatment machine, or any other machinery serving the same purpose known in the technical field. This corona treatment allows avoiding the use of adhesives between the resin-based intermediate layer (200) and the first primer sublayer (310), and hence their application and subsequent curing processes. In an embodiment of the invention, the corona treatment is performed at a speed between 8 to 14 m/min. In an embodiment of the invention, the corona treatment is performed at a speed between 9 to 13 m/min. In an embodiment of the invention, the corona treatment is performed at a speed between 9 to 12 m/min. In an embodiment of the invention, the corona treatment is performed at a speed between 9 to 11 m/min. In an embodiment of the invention, the corona treatment is performed at a potency between 1 to 5 kW. In an embodiment of the invention, the corona treatment is performed at a potency between 1 to 4 kW. In an embodiment of the invention, the corona treatment is performed at a potency between 2 to 4 kW. In an embodiment of the invention, the corona treatment is performed at a potency between 2 to 3 kW. In an embodiment of the invention, the corona treatment is performed at a speed between 8 to 14 m/min and a potency between 1 to 5 kW. In an embodiment of the invention, the corona treatment is performed at a speed between 9 to 12 m/min and a potency between 1 to 5 kW. In an embodiment of the invention, the corona treatment is performed at a speed between 9 to 11 m/min and a potency between 1 to 5 kW. In an embodiment of the invention, the corona treatment is performed at a speed between 9 to 11 m/min and a potency between 2 to 4 kW. In an embodiment of the invention, the corona treatment is performed at a speed between 9 to 11 m/min and a potency between 2 to 3 kW.

Application of the sublayers of steps (d) to (g) are independently done by rotogravure. Each step is independently performed using rotogravure cylinders inside printer machines equipped with infrared lamps and drying tunnels, or any other machinery serving the same purpose known in the technical field. In the embodiments of the invention where the sublayers are applied using rotogravure, the speed of application for each sublayer is independently selected between 7 and 17 m/min. In an embodiment of the invention, the speed of application for each sublayer is independently selected between 8 and 16 m/min. In an embodiment of the invention, the speed of application for each sublayer is independently selected between 9 and 15 m/min. In an embodiment of the invention, the speed of application for each sublayer is independently selected between 10 and 14 m/min. In an embodiment of the invention, the speed of application for each sublayer is independently selected between 10 and 17 m/min.

Figure 5B:
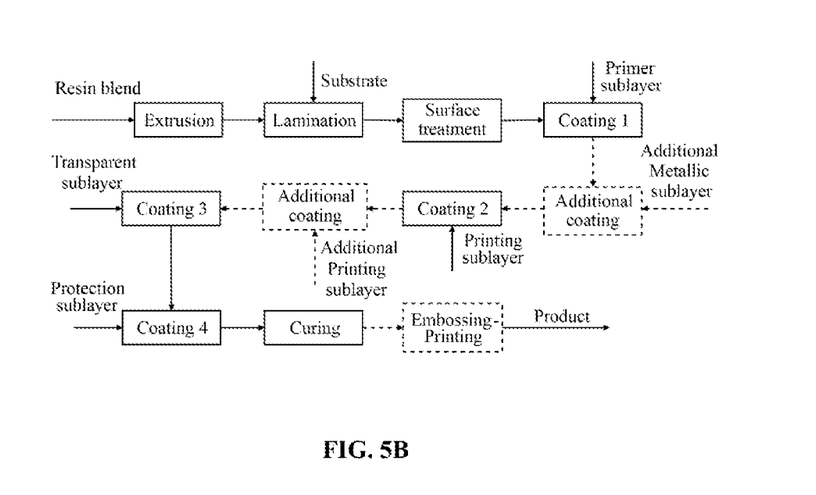
FIG. 5B. Schematic flow diagram of the manufacture process according to the invention, additionally marking the optional application of additional sublayers, and the optional final step of embossing-printing on the external surface of the textile product.

Referring to FIG. 5B, in an embodiment of the invention, an additional metallic sublayer (350) is optionally applied on the upper surface (311) of the first sublayer (310), before the application the second printing sublayer (320) of step (e). In this embodiment, the application of the additional metallic sublayer (350) is performed using a rotogravure cylinder inside a printer machine, or any other machinery serving the same purpose known in the technical field. In an embodiment of the present invention, this application is done by rotogravure. In the embodiments of the invention where the additional metallic sublayer (350) is applied using rotogravure, the speed of application is selected between 7 and 17 m/min. In an embodiment of the invention, the speed of application is selected between 8 and 16 m/min. In an embodiment of the invention, the speed of application is selected between 9 and 15 m/min. In an embodiment of the invention, the speed of application is selected between 10 and 14 m/min. In an embodiment of the invention, the speed of application is selected between 10 and 17 m/min.

Referring to FIG. 5B, in an embodiment of the invention, an additional printing sublayer (360) is optionally applied on the upper surface (321) of the second printing sublayer (320), before the application the third transparent sublayer (330) of step (f). In this embodiment, the application of the additional printing sublayer (360) is performed using rotogravure cylinders inside printer machine or any other machinery serving the same purpose known in the technical field. In an embodiment of the present invention, this application is done by rotogravure. In the embodiments of the invention where the additional printing sublayer (360) is applied using rotogravure, the speed of application is selected between 7 and 17 m/min. In an embodiment of the invention, the speed of application is selected between 8 and 16 m/min. In an embodiment of the invention, the speed of application is selected between 9 and 15 m/min. In an embodiment of the invention, the speed of application is selected between 10 and 14 m/min. In an embodiment of the invention, the speed of application is selected between 10 and 17 m/min.

Also referring to FIG. 5B, in an embodiment of the invention, both an additional metallic sublayer (350) and an additional printing sublayer (360) are optionally applied as mentioned above. This embodiment is also performed with the equipment and the process conditions mentioned above.

Although not depicted in FIG. 5A or 5B, in an embodiment of the invention, each one of steps (d) to (g) are followed by a drying step, followed by the application of the next sublayer. Each drying step is independently performed using infrared lamps, drying tunnels, or any other machinery serving the same purpose known in the technical field. In an embodiment of the present invention, each drying step is done by pre-drying hoods at 150° C. In the embodiments where an additional metallic sublayer (350), an additional printing sublayer (360), or both an additional metallic sublayer (350) and an additional printing sublayer (360) are applied as mentioned above, the application of each layer may be optionally followed by a drying step, which is independently performed using the equipment and conditions mentioned above.

Curing of step (g) may be selected from, but not limited to, time curing, chemical curing, UV curing, and temperature curing. In an embodiment of the present invention, the curing step is performed using an UV radiation chamber, or any other machinery serving the same purpose known in the technical field. In the embodiments where the curing process is UV curing, this step is performed at a radiation flux between 40 to 50 mW/cm². In an embodiment, the UV curing step is performed at a radiation flux between 42 to 48 mW/cm². In an embodiment of the present invention, the UV curing step is performed at a radiation flux between 44 to 47 mW/cm². In an embodiment of the present invention, the UV curing step is performed at a current between 7 to 9 A. In an embodiment of the present invention, the UV curing step is performed at an air speed between 6 to 9 m/min. In an embodiment of the invention, the UV curing step is performed at an air speed between 6 to 8 m/min. In an embodiment of the present invention, the UV curing step is performed at a radiation flux between 40 to 50 mW/cm², at 7 to 9 A and an air speed between 6 to 9 m/min. In an embodiment of the present invention, the UV curing step is performed at a radiation flux between 42 to 48 mW/cm², at 7 to 9 A and an air speed between 6 to 9 m/min. In an embodiment of the present invention, the UV curing step is performed at a radiation flux between 44 to 47 mW/cm², at 7 to 9 A and an air speed between 6 to 9 m/min. In an embodiment of the present invention, the UV curing step is performed at a radiation flux between 44 to 47 mW/cm², at 7 to 9 A and an air speed between 6 to 8 m/min.

Referring to FIG. 5B, in an embodiment of the present invention, the process also comprises an additional step (i) of embossing-printing a pattern. In an embodiment of the present invention, the embossing-printing step (i) is performed using infrared (IR) radiation. This step is performed using hot embossing machine equipped with infrared lamps, or any other machinery serving the same purpose known in the technical field. In an embodiment of the present invention, the embossing-printing step is performed at an IR radiation intensity between 10 and 12. In an embodiment of the present invention, the embossing-printing step is performed at a speed between 5.5 and 6 m/min. In an embodiment of the present invention, the embossing-printing step is performed at a steam temperature of 120° C. In an embodiment of the present invention, the embossing-printing step is performed at an IR radiation intensity between 10 and 12, a speed between 5.5 and 6 m/min, and a steam temperature of 120° C. In an embodiment of the present invention, step (i) is performed 24 hours after the curing of step (g), in order to let the cured protection sublayer (340) from step (h) to properly stabilize and hence provide the optimal desired properties.

Regarding the performance characteristics of the coated textile product, the abrasion resistance was measured using the Wyzenbeek (100,000 cycles) and Taber (250 cycles with 250 g of weight) abrasion methods, the flexibility was determined through the Newark method (minimum 30,000 cycles), the stain resistance followint the CCFA 141 cleaners test method, where it showed resistance to stains of chocolate, Coca Cola®, tomato sauce, mustard, red wine, vegetable oil and suntan lotion with exposure for 24 hours and 72 hours and, the chemical resistance characteristics were found using the ACT BIFMA 2017 method, showing resistance of the product against cleaners such as Virex 1:254, Dispatch 1:10, IsoPropilAlcohol 91%, IPA 70%, Cavi Wipes XL, Clorox Bleach Germicidal Wipes, Clorox Hydrogen Peroxide, Disinfecting Cleaner, Oxivir TB Wipes, Oxivir 1, Sani-Cloth Germicidal Wipes, Virex TB, Formula 409, 3M Neutral Quad Disinfectant Cleaner Concentrate 23, Virex Plus 1:256 and Bleach at 0.56% concentration.

The embodiments and results mentioned above are illustrated in the following examples.

EXAMPLES

Example 1. Preparation of Product 001

The Product 001 is prepared according to the following process:

A TPE resin that would form the resin-based intermediate layer (200) is prepared by mixing 82.4% w/w of the TPE resin TPE-O, without process aid additive, 3% w/w of the antiblock additive Comaster 733 4AB, 10.3% w/w of mineral filler additive calcium carbonate, and 4.2% w/w of the pigment masterbatch until obtaining a uniform mixture. Said mixture is then transformed into pellets by compounding extrusion at 100-150° C. and 12 kg/h. Those pellets are then extruded at a temperature between 160-170° C. at 8 m/min in the form of a circular profile, which is then passed through a lamination process using rolling mills at 160, 165 and 180° C. to form the resin-based intermediate layer (200).

This layer is then laminated onto a fabric substrate layer (100) by contacting the lower surface (202) of the resin-based intermediate layer (200) with the upper surface (101) of 250 g/m² of the fabric substrate layer (100) made of polyester.

After lamination of the fabric substrate layer (100), the upper surface (201) of the resin-based intermediate layer (200) is treated with a corona treatment at 10 m/min of speed and 2.86 kW of potency.

Then, 2 g/m² a first polyurethane-based primer sublayer (310) comprising 95.3% w/w of solvent-based polyurethane and 4.7% w/w isocyanate as crosslinking agent is applied by rotogravure at 10 m/min of rate on the treated surface of the resin-based intermediate layer (200), followed by a drying step using a drying chamber at 150° C. to remove the solvent.

2 g/m² of a second polyurethane-based printing sublayer (320) comprising 8.7% w/w of the pigment dispersed in 87% w/w of solvent-based polyurethane and 4.3% w/w isocyanate as crosslinking agent is then applied on the upper surface (311) of the first polyurethane-based primer sublayer (310), by rotogravure at a speed of 14 m/min, followed by a drying step using a drying chamber at 150° C. to remove the solvent.

2.5 g/m² of a third polyurethane-based transparent sublayer (330) comprising 95.3% w/w of solvent-based polyurethane and 4.7% w/w isocyanate as crosslinking agent is applied on the upper surface (321) of the second polyurethane-based printing sublayer (320), by rotogravure at a speed of 14 m/min, followed by a drying step using a drying chamber at 150° C. of temperature to remove the solvent.

Then, 7 g/m² of a fourth polyurethane-based protection sublayer (340) comprising 71.6% w/w of water-based polyurethane, 0.8% w/w of a photo initiator additive, 5.3% w/w of isocyanate as crosslinking agent, 14.3% w/w of a touch modifier additive dispersed in water, 0.1% w/w of a defoaming additive and, 7.9% w/w of a mating agent, is applied on the upper surface (331) of the third polyurethane-based transparent sublayer (330) by rotogravure at a speed of 17 m/min.

The fourth polyurethane-based protection sublayer (340) is then cured using UV radiation at a radiation flux of 45 mW/cm², 8.1 A and an air flow of 7 m/min.

The coated textile product is passed through an embossing-printing system with heat, at a speed of 5.5-6 m/min and at 120° C., 24 hours after the UV curing step.

The product resulting from the previous process comprises the composition summarized in Table 1 below:

TABLE 1

| Layer | Ingredient | Percentage in the layer (% w/w) | Grammage in the total product (g/m$^2$) |
|---|---|---|---|
| Substrate | Polyester | 100 | 250-280 |
| Intermediate layer | TPE resin | 82.4 | 240-270 |
| | Process aid additive | 0 | |
| | Antiblock additive | 3 | |
| | Mineral filler additive | 10.3 | |
| | Pigment masterbatch | 4.2 | |
| First primer sublayer | Solvent based polyurethane | 95.3 | 2.0 |
| | Isocyanate Crosslinker | 4.7 | |
| Second printing sublayer | Solvent based polyurethane | 87 | 2.0 |
| | Isocyanate Crosslinker | 4.3 | |
| | Pigment | 8.7 | |
| Third transparent sublayer | Solvent based polyurethane | 95.3 | 2.5 |
| | Isocyanate Crosslinker | 4.7 | |
| Fourth protection sublayer | Water based polyurethane | 71.6 | 7.0 |
| | Isocyanate Crosslinker | 5.3 | |
| | Photo initiator additive | 0.8 | |
| | Touch modifier additive dispersed in water | 14.3 | |
| | Defoaming additive | 0.1 | |
| | Mating agent | 7.9 | |

Example 2. Effect of the Presence of a Process Aid Additive

In order to evaluate the effect of the presence of a process aid additives in the quality of the final product, a coated textile product (Reference Product 1) is manufactured using the same process for the preparation of Product 001, except that the TPE resin used to obtain the resin-based intermediate layer (200) is prepared by mixing 78.4% w/w of the TPE resin TPE-O, 4.9% w/w of a process aid additive Epoxidized Soybean Oil (ESO), 2.9% w/w of the antiblock additive Comaster 733 4AB, 9.8% w/w of mineral filler additive calcium carbonate and, 4% w/w of the pigment masterbatch until obtaining a uniform mixture.

A migration test was performed on both Product 001 and Reference Product 1. This method allows determining the tendency that an additive have to migrate (or exude) from the plastic products in which they are contained, to other plastics or materials in general, if both substances are in close contact. This method comprises the following steps:
1. Cut a 70 mm by 47 mm sample of the material or plate to be analyzed with a gauge of approximately 1.0 mm.
2. Place the samples in such a way that the specimen or specimens to be tested are in the middle of two sheets of acetate sheets, organized in such a way that almost the entire area of the acetate sheet is used. Then, this assembly is placed between two glass plates and subsequently placed in an oven at 70±5° C. during 24±1 hours.
3. Once the time has passed, the samples are naturally cooled and the specimens and acetates sheets are compared (if it is necessary, the duration of the test can be extended).

Results from this test show that the product where a process aid additive is used, the resin-based intermediate layer (200) presented fogging, while in Product 001 this fogging effect was not present. In this case, fogging effect indicates migrations of an additive from the polymer to the acetate sheets, this is caused by an incompatibility between polymer and the additive, which can cause exudation. Loss of additives can lead to less flexibility, embrittlement, and cracking.

Example 3. Effect of the Nature of the First Primer Sublayer

In order to evaluate the effect of the of the nature of the first primer sublayer on the quality of the final product, a coated textile product (Reference Product 2) is manufactured using the same process for the preparation of Product 001, except that 2 g/m$^2$ of a first water-based primer sublayer comprising 100% w/w of water-based halogenated polyolefine is applied by rotogravure at 10 m/min of rate on the treated surface of the intermediate layer (200), followed by a drying step using a drying chamber at 130° C. of temperature to remove the water.

In the Reference Product 2, the water-based halogenated polyolefin primer sublayer makes the surface (312) sticky, which makes it easy for the primer sublayer to become contaminated. In addition, the sticky surface of the primer sublayer generates high tension in the printer machine, which results in a considerable reduction of the final product desired width, wherein the desired width is 1.37 m and the obtained width is between 1.28-1.3 m. However, in Product 001, the surface is less sticky, making the upper surface (311) of the primer sublayer (310) less susceptible to contamination, and allows to achieve the desired width of at least 1.37 m, wherein the width obtained is between 1.37 to 1.40 m. Therefore, employing a first solvent-based polyurethane primer sublayer (310) provides the possibility to produce a coated textile product having a width that satisfy the market demands.

Example 4. Effect of the Presence of a Third Transparent Sublayer (330)

In order to evaluate the effect of the presence of a third transparent sublayer (330) in the quality of the final product, a coated textile product (Reference Product 3) is manufactured using the same process for the preparation of Product 001, except that the third transparent polyurethane-based sublayer (330) is not applied.

An abrasion test was performed on both Product 001 and the Reference Product 3, according to the Taber Abrasion Resistance, ASTM D-3389 standard test, carried out with a stone H18 (250 g) during 250 cycles. These results demonstrate that the Reference Product 3 shows notorious changes such as loss of coating layer and printed pigments, showing a notable wear, therefore not meeting the quality standard according to the market demand. On the contrary, Product 001 do not show any significant change, hence satisfying the market quality requirements for this kind of coated textile products.

Example 5. Preparation of Product 002

The Product 002 is manufactured using the same process for the preparation of Product 001, but applying 2 g/m$^2$ of an additional polyurethane-based metallic sublayer (350) on the upper surface (311) of the first primer sublayer (310) and before applying the second printing sublayer (320). Here, the polyurethane-based metallic sublayer (350) has 87-94.3% w/w of solvent based polyurethane and 4.3-4.7% w/w isocyanate as crosslinking and 0.9-8.7% effect pigments, applied by rotogravure at a speed of 10 m/min, followed by a drying step using a drying chamber at 150° C. to remove the solvent. The product resulting from the previous process comprises the composition summarized in Table 2 below, having a metallic effect color:

TABLE 2

| Layer | Ingredient | Percentage in the layer (% w/w) | Grammage in the total product (g/m$^2$) |
|---|---|---|---|
| Substrate | Polyester | 100 | 250-280 |
| Intermediate layer | TPE resin | 78.4 | 240-270 |
| | Process aid additive | 4.9 | |
| | Antiblock additive | 2.9 | |
| | Mineral filler additive | 9.8 | |
| | Pigment masterbatch | 4.0 | |
| First primer sublayer | Solvent based polyurethane | 95.3 | 2.0 |
| | Isocyanate Crosslinker | 4.7 | |
| Additional metallic sublayer | Solvent based polyurethane | 87-94.3 | 2.0 |
| | Isocyanate Crosslinker | 4.3-4.7 | |
| | Effect Pigment | 0.9-8.7 | |
| Second printing sublayer | Solvent based polyurethane | 87 | 2.0 |
| | Isocyanate Crosslinker | 4.3 | |
| | Pigment | 8.7 | |
| Third transparent sublayer | Solvent based polyurethane | 95.3 | 2.5 |
| | Isocyanate Crosslinker | 4.7 | |
| Fourth protection sublayer | Water based polyurethane | 71.6 | 7.0 |
| | Isocyanate Crosslinker | 5.3 | |
| | Photo initiator additive | 0.8 | |
| | Touch modifier additive dispersed in water | 14.3 | |
| | Defoaming additive | 0.1 | |
| | Mating agent | 7.9 | |

Example 6. Preparation of Product 003

The Product 003 is manufactured using the same process for the preparation of Product 001, but applying 2 g/m$^2$ of an additional printing sublayer (360) on the upper surface (321) of the second printing sublayer (320), 87% w/w of solvent-based polyurethane and 4.3% w/w isocyanate as crosslinking and 8.7% dispersed pigments, applied by rotogravure at a speed of 10 m/min, followed by a drying step using a drying chamber at 150° C. to remove the solvent. The product resulting from the previous process comprises the composition summarized in Table 3 below, having two printed sublayers:

TABLE 3

| Layer | Ingredient | Percentage in the layer (% w/w) | Grammage in the total product (g/m$^2$) |
|---|---|---|---|
| Substrate | Polyester | 100 | 250-280 |
| Intermediate layer | TPE resin | 78.4 | 240-270 |
| | Process aid additive | 4.9 | |
| | Antiblock additive | 2.9 | |
| | Mineral filler additive | 9.8 | |
| | Pigment masterbatch | 4.0 | |
| First primer sublayer | Solvent based polyurethane | 95.3 | 2.0 |

TABLE 3-continued

| Layer | Ingredient | Percentage in the layer (% w/w) | Grammage in the total product (g/m$^2$) |
|---|---|---|---|
| | Isocyanate Crosslinker | 4.7 | |
| Second printing sublayer | Solvent based polyurethane | 87 | 2.0 |
| | Isocyanate Crosslinker | 4.3 | |
| | Pigment | 8.7 | |
| Additional printing sublayer | Solvent based polyurethane | 87 | 2.0 |
| | Isocyanate Crosslinker | 4.3 | |
| | Pigment | 8.7 | |
| Third transparent sublayer | Solvent based polyurethane | 95.3 | 2.5 |
| | Isocyanate Crosslinker | 4.7 | |
| Fourth protection sublayer | Water based polyurethane | 71.6 | 7.0 |
| | Isocyanate Crosslinker | 5.3 | |
| | Photo initiator additive | 0.8 | |
| | Touch modifier additive dispersed in water | 14.3 | |
| | Defoaming additive | 0.1 | |
| | Mating agent | 7.9 | |

Example 7. Preparation of Product 004

The Product 004 is manufactured using the same process for the preparation of Product 001, but applying 2 g/m$^2$ of an additional polyurethane-based metallic sublayer (350) on the upper surface (311) of the first primer sublayer (310) and before applying the second printing sublayer (320), and also 2 g/m$^2$ of an additional printing sublayer (360) on the upper surface (321) of the second printing sublayer (320). The polyurethane-based metallic sublayer (350) has 87-94.3% w/w of solvent-based polyurethane and 4.3-4.7% w/w isocyanate as crosslinking and 0.9-8.7% effect pigments, was applied by rotogravure at a speed of 10 m/min, followed by a drying step using a drying chamber at 150° C. to remove the solvent.

The additional printing sublayer (360) has 87% w/w of solvent-based polyurethane and 4.3% w/w isocyanate as crosslinking and 8.7% dispersed pigments, was applied by rotogravure at a speed of 10 m/min, followed by a drying step using a drying chamber at 150° C. to remove the solvent.

The product resulting from the previous process comprises the composition summarized in Table 4 below, having a metallic effect color and two printed sublayers

TABLE 4

| Layer | Ingredient | Percentage in the layer (% w/w) | Grammage in the total product (g/m$^2$) |
|---|---|---|---|
| Substrate | Polyester | 100 | 250-280 |
| Intermediate layer | TPE resin | 78.4 | 240-270 |
| | Process aid additive | 4.9 | |
| | Antiblock additive | 2.9 | |
| | Mineral filler additive | 9.8 | |
| | Pigment masterbatch | 4.0 | |
| First primer sublayer | Solvent based polyurethane | 95.3 | 2.0 |
| | Isocyanate Crosslinker | 4.7 | |
| Additional metallic sublayer | Solvent based polyurethane | 87-94.3 | 2.0 |
| | Isocyanate Crosslinker | 4.3-4.7 | |
| | Effect Pigment | 0.9-8.7 | |
| Second printing | Solvent based polyurethane | 87 | 2.0 |

TABLE 4-continued

| Layer | Ingredient | Percentage in the layer (% w/w) | Grammage in the total product (g/m²) |
|---|---|---|---|
| sublayer | Isocyanate Crosslinker | 4.3 | |
| | Pigment | 8.7 | |
| Additional printing sublayer | Solvent based polyurethane | 87 | 2.0 |
| | Isocyanate Crosslinker | 4.3 | |
| | Pigment | 8.7 | |
| Third transparent sublayer | Solvent based polyurethane | 95.3 | 2.5 |
| | Isocyanate Crosslinker | 4.7 | |
| Fourth protection sublayer | Water based polyurethane | 71.6 | 7.0 |
| | Isocyanate Crosslinker | 5.3 | |
| | Photo initiator additive | 0.8 | |
| | Touch modifier additive dispersed in water | 14.3 | |
| | Defoaming additive | 0.1 | |
| | Mating agent | 7.9 | |

Example 8. Mechanical Properties of Products 002, 003 and 004

Products 002, 003 and 004 were subjected to several mechanical test according to the standards mentioned in Table 4 below. The results also mentioned in Table 4 indicate that the manufactured coated textile products satisfy the market needs:

TABLE 5

| Tests | External method | Condition | Result for product 002 | Result for product 003 | Result for product 004 |
|---|---|---|---|---|---|
| Flexibility | NEWARK - ASTM D 2097 | 30,000 cycles | Warp: Pass Fill: Pass | Warp: Pass Fill: Pass | Warp: Pass Fill: Pass |
| | BALLY NTC- ISO 5402 | 5,000 cycles | Warp: Pass Fill: Pass | Warp: Pass Fill: Pass | Warp: Pass Fill: Pass |
| Crocking resistance | CROCKING - CFFA-7, FED. ST. 191 A- M, 191 A | 10 cycles | Wet: Excellent Dry: Excellent IPA: Good | Wet: Excellent Dry: Excellent IPA: Good | Wet: Excellent Dry: Excellent IPA: Good |
| | CROCKING - CFFA-7, FED. ST. 191 A- M, 191 A | 20 cycles | Wet: Excellent Dry: Excellent IPA: Good | Wet: Excellent Dry: Excellent IPA: Good | Wet: Excellent Dry: Excellent IPA: Good |
| Abrasion resistance | ISO 12947-2 MARTINDALE | 100,000 cycles | Min. Grade 3 | Min. Grade 3 | Min. Grade 3 |
| Resistance to chemical reagents | DIRECT CONTACT | 5.6% hypochlorite | No pass | No pass | No pass |
| | | 0.56% hypochlorite | Slight change | Slight change | Slight change |
| | | 1% soap dilution in water | Slight change | Slight change | Slight change |
| | | IPA | Slight change | Slight change | Slight change |
| Topcoat adhesion | TOPCOAT ADHESION | ASTM D3359 | Gt-0 | Gt-0 | Gt-0 |
| Abrasion resistance | WYZENBEE K ABRASION | 100,000 cycles | Pass | Pass | Pass |
| | TABER ABRASION | H-18 stone 250 g - 250 cycles | Pass | Pass | Pass |
| Accelerated light aging | XENOTEST NTC 1479/ AATCC 16E | 1,000 hours | Min. 6 | Min. 6 | Min. 6 |
| | QUV ASTM D 4329 | 650 hours | Min. 4 | Min. 4 | Min. 4 |

What is claimed is:

1. A coated textile product comprising:
   a fabric substrate layer (100) having an upper surface (101) and a lower surface (102);
   a resin-based intermediate layer (200) having an upper surface (201) and a lower surface (202); and
   a protecting coating upper layer (300), comprising at least the following sublayers in the following order:
      a first polyurethane-based primer sublayer (310) having an upper surface (311) and a lower surface (312);
      a second polyurethane-based printing sublayer (320) having an upper surface (321) and a lower surface (322), further comprising a pigment;
      a third polyurethane-based transparent sublayer (330) having an upper surface (331) and a lower surface (332), further comprising a first crosslinking agent; and
      a fourth polyurethane-based protection sublayer (340) having an upper surface (341) and a lower surface (342), further comprising a second crosslinking agent;
   wherein the lower surface (312) of the first polyurethane-based primer sublayer (310) is facing towards the upper surface (201) of the resin-based intermediate layer (200) and the upper surface (341) of the polyurethane-based protection sublayer (340) is the external surface of the coated textile product.

2. The coated textile product of claim 1, wherein the fabric substrate layer (100) is present between 130 and 420 g/m².

3. The coated textile product of claim 1, wherein the fabric substrate layer (100) is selected from polyester, cotton, nylon, and mixtures thereof.

4. The coated textile product of claim 1, wherein the resin-based intermediate layer (200) is present between 190 and 290 g/m$^2$.

5. The coated textile product of claim 1, wherein the resin-based intermediate layer (200) comprises a TPE resin.

6. The coated textile product of claim 1, wherein the TPE of the resin-based intermediate layer (200) is selected from TPE-O, TPE-U, TPE-V, TPE-E, TPE-A and TPE-S.

7. The coated textile product of claim 1, wherein the resin-based intermediate layer (200) does not comprise a process aid additive.

8. The coated textile product of claim 1, wherein the protecting coating upper layer (300) is present between 8 and 18 g/m$^2$.

9. The coated textile product of claim 1, wherein the protecting coating upper layer (300) comprises:
  between 1 and 7 g/m$^2$ of the first polyurethane-based primer sublayer (310);
  between 1 and 5 g/m$^2$ of the second polyurethane-based printing sublayer (320);
  between 1 and 7 g/m$^2$ of the third polyurethane-based transparent sublayer (330); and
  at least 7 g/m$^2$ of the fourth polyurethane-based protection sublayer (340).

10. The coated textile product of claim 1, wherein the pigment of the second polyurethane-based sublayer (320) is present between 0.1% and 10% w/w of said sublayer.

11. The coated textile product of claim 1, wherein the pigment of the second polyurethane-based sublayer (320) is selected from organic pigments, inorganic pigments, solvent-based pigment preparations, solid pigments and effect pigments.

12. The coated textile product of claim 1, wherein the first and second crosslinking agent in the third transparent sublayer (330) and the fourth protection sublayer (340) respectively, are independently selected from aliphatic isocyanate, aromatic isocyanate, aziridine, polycarbodimide, and amines.

13. The coated textile of claim 1, wherein the protecting coating upper layer (300) further comprises an additional polyurethane-based metallic sublayer (350) having an upper surface (351) and a lower surface (352), between the first polyurethane-based primer sublayer (310) and the second polyurethane-based printing sublayer (320).

14. The coated textile of claim 1, wherein the protecting coating upper layer (300) further comprises an additional polyurethane-based printing sublayer (360) having an upper surface (361) and a lower surface (362), between the second polyurethane-based printing sublayer (320) and the third polyurethane-based transparent sublayer (330).

15. A process to produce the coated textile product of claim 1, comprising the following steps:
  (a) laminating resin-based intermediate layer (200) by contacting the lower surface (202) of the resin-based intermediate layer (200) with the upper surface (101) of the fabric substrate layer (100);
  (b) applying a surface treatment on the upper surface (201) of the resin-based intermediate layer (200) obtained in step (a);
  (c) applying the first polyurethane-based primer sublayer (310) by contacting its lower surface (102) with the treated surface of step (b);
  (d) applying the second polyurethane-based printing sublayer (320) by contacting its lower surface (322) with the upper surface (311) of the first polyurethane-based primer sublayer (310) from step (c);
  (e) applying the third polyurethane-based transparent sublayer (330) by contacting its lower surface (332) with the upper surface (321) of the second polyurethane-based printing sublayer (320) from step (d);
  (f) applying the fourth polyurethane-based protection sublayer (340) by contacting its lower surface (342) with the upper surface (331) of the third polyurethane-based transparent sublayer (330) from step (e); and
  (g) curing the fourth polyurethane-based protection sublayer (340) from step (f).

16. The process of claim 15, wherein the surface treatment of step (b) is selected from corona, flame, chemical attack, solvent attack, plasma, radiofrequency.

17. The process of claim 15, wherein the surface treatment of step (b) is corona treatment, performed at a rate between 8 to 14 m/min and a potency between 1 to 5 kW.

18. The process of claim 16 wherein each of steps (c) to (f) are followed by a drying step.

19. The process of claim 15, wherein the curing of step (g) is selected from time curing, chemical curing, UV curing, and temperature curing.

20. The process of claim 15, wherein the curing of step (g) is UV curing, performed at a radiation flux between 40 to 50 mW/cm$^2$, at 7 to 9 A and an air speed between 6 to 9 m/min.

21. The process of claim 15, further comprising a step (h) of embossing-printing on the upper surface (341) of the fourth polyurethane-based protection sublayer (340) from step (g).

22. The process of claim 21, wherein step (h) is performed using IR radiation with an intensity between 10 and 12, at a speed between 5.5 and 6 m/min, and steam temperature of 120° C.

23. The process of claim 21, wherein step (h) is performed 24 hours after the curing of step (f).

* * * * *